United States Patent
Everett

Patent Number: 5,864,816
Date of Patent: Jan. 26, 1999

[54] COMPRESSED AUDIO SIGNAL PROCESSING

[75] Inventor: Timothy J. Everett, Horley, England

[73] Assignee: U.S. Philips Corporation, New York, N.Y.

[21] Appl. No.: 824,623

[22] Filed: Mar. 27, 1997

[30] Foreign Application Priority Data

Mar. 29, 1996 [GB] United Kingdom .................. 9606680

[51] Int. Cl.$^6$ ..................................................... G10L 9/00
[52] U.S. Cl. ........................................... 704/500; 704/229
[58] Field of Search .................................. 704/200, 205, 704/500, 501, 502, 503, 504, 229, 230; 348/405, 409, 384, 398, 17, 416, 515; 375/240

[56] References Cited

U.S. PATENT DOCUMENTS

| | | | |
|---|---|---|---|
| 5,524,054 | 6/1996 | Spille | 381/18 |
| 5,596,420 | 1/1997 | Daun | 386/110 |
| 5,619,197 | 4/1997 | Nakamura | 341/50 |
| 5,675,703 | 10/1997 | Sato | 704/230 |
| 5,764,698 | 6/1998 | Sudharsanan et al. | 375/241 |

FOREIGN PATENT DOCUMENTS

| | | | |
|---|---|---|---|
| WO9421079 | 9/1994 | WIPO | H04N 5/262 |
| WO9637074 | 11/1996 | WIPO | H04N 5/262 |

OTHER PUBLICATIONS

"Algorithms For Manipulating Compressed Images" By Brian C. Smith and Lawrence A. Rowe, IEEE Computer Graphics and Applications, Sep. 1993, vol. 13 (No. 5) pp. 34–42.

"Manipulation and Compositing of MC–DCT Compressed Video" By Shi–Fu Chang and David G. Messerschmitt, IEEE Journal on Selected Areas in Communications, vol. 13, (No. 1) Jan. 1995, pp. 1–11.

"Fast Software Processing of Motion JPEG Video" By Brian C. Smith of Cornell University.

Primary Examiner—Richemond Dorvil
Attorney, Agent, or Firm—Steven R. Biren

[57] ABSTRACT

Techniques for applying attenuation to audio signal frames in MPEG and similar compression systems are described, together with a method for mixing such signals without decompression. Each entry in a data frame (F) has an associated scale-factor index (SF), identifying a respective entry in a sequentially arranged and spaced table of scale-factor values. The attenuation technique (20), which suitably precedes mixing for at least one channel involves simple addition to scale factor index values to refer to a different scale-factor value. Respective sub-band data groups from each channel are compared in terms of their respective scale factors and following scaling the data for the two groups is added together. The scale-factor table spacing, which suitably corresponds to a 1 dB attenuation, is used for quick scaling of the results of the addition if overflow is determined to have occurred.

14 Claims, 4 Drawing Sheets

FIG. 4

COMPRESSED AUDIO SIGNAL PROCESSING

BACKGROUND OF THE INVENTION

1. Field of the Invention

The present invention relates to methods for the attenuation and mixing of audio signals, and to apparatuses embodying such methods, and particularly, but not exclusively, to the mixing of compressed and/or encoded audio data streams according to MPEG standards.

2. Description of Related Art

MPEG audio compression as defined in ISO 11172-3 (MPEG1) and ISO 13818-3 (MPEG2) relies on the fact that, for humans, there are certain frequencies that are heard better than others. The audio data is first transposed to the frequency domain from the temporal domain, and divided into sub-bands covering the audible frequency range. Sample data for each sub-band is assigned bandwidth in an amount dependent on how well it is heard, on the basis of a psycho-acoustic model defined in the MPEG standard, which relates not just the frequencies present at a given instant, but also those which have recently been present. The less-well heard frequencies are then sent at a lower bit-rate such as to give compression.

A recognised problem with compression techniques such as MPEG, JPEG and the H.261 standard for video telephony is the difficulty of manipulating the coded data without the time consuming step of first decoding it. Much of the existing work in this area has concentrated on the manipulation of compressed video data, as described for example in "Algorithms for Manipulating Compressed Images" by Brian C. Smith and Lawrence A. Rowe, IEEE Computer Graphics and Applications, September 1993, Vol.13 (No.5) pp.34–42; "Manipulation and Compositing of MC-DCT Compressed Video" by Shih-Fu Chang and David G. Messerschmitt, IEEE Journal on Selected Areas in Communications, Vol.13 (No.1) January 1995, pp.1–11; and International Patent application WO94/21079 to Chang et al/University of California. The techniques described are based around relatively complex algorithms evolved for particular classes of image manipulations and still require at least partial decoding of signals, for example to remove motion compensation, prior to their application.

It has been suggested that some of these algorithms might be investigated for their possible application to audio data. However, due to the generally more complex nature of the video component of a compressed video and audio stream (for example a film with soundtrack), the time required to apply the algorithms to partially decoded but compressed video has been sufficient to allow traditional "brute force" (i.e. complete decoding and recoding) techniques to the accompanying audio.

SUMMARY OF THE INVENTION

Recognizing the potential benefits in terms of speed for purely audio applications, and in terms of efficiency for multiple audio signal applications (either apart from, or in combination with, video), it is an object of the present invention to provide a method and apparatus for applying signal processing techniques to streams of compressed data.

It is a further object of the present invention to facilitate the mixing of streams of audio data in compressed form.

In accordance with the present invention there is provided a method for applying attenuation to a compressed digitized audio signal, wherein a first table of L scale-factors is defined comprising a stepped series of L numerical values with the second and each subsequent value being derived from the preceding value by a common function and each of the scale-factors being uniquely identified by a respective scale factor index value, and said signal is in the form of sequential frames of digital data, with each frame, in a common arrangement, comprising at least the following sections:

sub-band data values, representing a plurality of sample-point values for the or each of one or more sub-bands, wherein the or each sub-band represents a respective frequency bandwidth; and scale-factor index values, at least one being assigned to each of said one or more sub-bands and identifying the respective numerical scaling factor to be applied thereto on decompression of the signal;

characterised in that said scale factor index values comprise L sequential integer values, and said method further comprises, for each sub-band, the steps of: identifying the desired attenuation as M steps of said series of L numerical values; and adding M to the or each scale factor index assigned to said sub-band, wherein $1 \leq M < L$, and L and M are integers.

By utilising the regular stepping of entries in the scale-factor table for MPEG and similarly coded signals, the attenuation becomes a simple matter of addition. In the case of MPEG, the spacing of entries in the scale-factor table corresponds to 1 dB and hence to attenuate by 0.5 (equivalent to 3 dB) simply requires the addition of the integer value 3 to the scale factor index value.

The present invention further provides a method for mixing two or more compressed digitised audio signals of the type described, the method further comprising mixing respective sub-bands from each signal and, for the or each group of sub-bands to be mixed, it comprises the steps of: identifying the sub-band having the largest associated scale-factor; scaling the data values of the or those sub-bands having smaller associated scale-factors to the same scale range as the first; and adding the respective sets of data values together. The mixing method may be preceded by applying attenuation as above, that is to say by identifying a desired attenuation for at least one of said sub-band pair, as M steps of said series of L numerical values; and adding M to each scale factor index assigned to said sub-band, wherein $1 \leq M < L$, and L and M are integers.

The scaling of the sub-band data values may suitably be by use of a two-dimensional look-up table indexed by the difference in scale-factor index values of the two sub-bands, and by the data value in question. A plurality of sub-bands representing respective frequency bandwidths are preferably defined in a frame, with the method suitably including individually determining and applying a respective value of M (the scale-factor table index) for each sub-band.

In terms of precautionary features, if the step of identifying the sub-band having the larger associated scale-factor shows a difference between the scale-factors in excess of a predetermined threshold, it is preferred that the sub-band having the smaller scale-factor is not scaled but is discarded and the sub-band having the larger scale-factor is output: this equates to one signal being so loud as to drown out another. Additionally, following addition of the respective sets of sub-band data values, a check is preferably made to determine whether the result exceeds a predetermined number of bits in length (an overflow condition) and, if so, the scale-factor index for that result may be incremented by an integer value to scale the result.

BRIEF DESCRIPTION OF THE DRAWINGS

Further features and advantages of the present invention will become apparent on reading of the following description of preferred embodiments of the present invention, in terms of audio signals compressed in accordance with MPEG standards by way of example only, and with reference to the accompanying drawings, in which:

FIG. 1 schematically represents a frame of audio data according to the MPEG-1 standard;

FIGS. 3 and 4 represent variations in on-screen control-panel displays which may be used in conjunction with the process of FIG. 3.

DETAILED DESCRIPTION OF THE PREFERRED EMBODIMENT

As previously mentioned, MPEG audio compression relies on the fact that, for humans, there are certain frequencies that are heard better than others, with the less-well heard frequencies being sent at a lower bit-rate such as to give compression. MPEG permits the use of up to 32 sub-bands to cover the audible frequency range, with each MPEG packet containing 36 samples for each of the sub-bands, and the data for each sub-band being assigned a respective bandwidth.

Figures 1, 3:
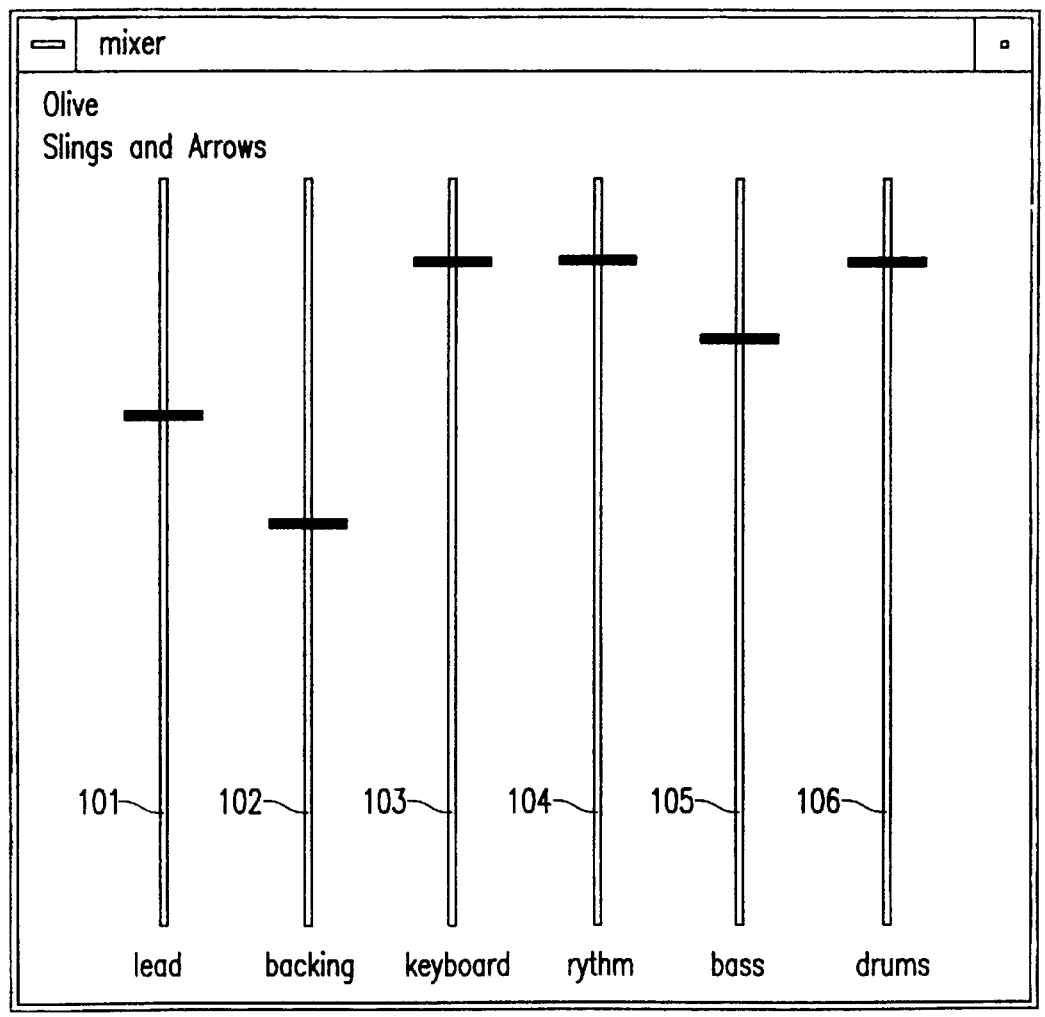

An MPEG frame consists of data arranged as shown in FIG. 1, with each of the sections of that frame containing a respective integer number of bits. The header H consists of 32 bits in a specified arrangement describing the frame in terms of its bit-rate, sampling frequency, whether it carries mono or stereo information and so forth. The header H also includes one bit which is used to flag whether or not cyclic-redundancy checking (CRC) has been added: if so, the header section will be immediately followed by a 16-bit CRC value (not shown).

Following the header H (or CRC value if provided), the sub-band allocation SBA section data identifies which sub-bands are present in a frame, together with an indication of how many bits are allocated per sub-band sample. The SBA section is an array of integers (one per sub-band) each of which is an index to a table of representations for data values for that sub-band. Several such tables are specified in the MPEG standard, with the choice in terms of length and format for the SBA section depending on bit-rate and sampling frequency; for example a 64 Kbit stream sampled at 44.1 KHz. MPEG specifies a maximum of 27 array entries (i.e. for only 27 of the possible 32 sub-bands) with the array entries being specified in different numbers of bits; for example entries 0 to 10, four bits; entries 11 to 22, three bits; and entries 23 to 26, two bits.

Note that, if there is a zero entry in the SBA section, this means that the sub-band is not present in the frame and data for this frame will be skipped in all further sections.

As previously mentioned, the sub-band data consists of 36 samples per sub-band. Part of the compression process is sequentially grouping these values as three groups of 12. Each group is analysed to find its maximum (absolute) value which, in the form of a 6-bit integer, is then used to select a scale factor for the group from the scale-factor table specified in MPEG. The values are then divided by the scale factor before further processing.

The three selected scale-factors for a sub-band are then checked to see whether further compression is available—for example with a pair of scale-factors within one or two dB of each other, the larger value will be used for both. The frame section SFGD (scale-factor grouping data) of the frame carries data about this latter compression in the form of an array of two bit values which identify whether three separate scale-factors are to be transmitted for a particular sub-band, whether two are to be transmitted (with the first or second being used twice), or whether a single scale-factor is to be applied for all three values.

The next section of the frame SF carries the scale-factor index data as derived from the data in the previous section, that is to say the 6-bit integers which index the scale-factor table. The scale-factor table comprises an array of 63 entries, the first of which is 2.0000 with each further entry being approximately 0.7937 of the previous one—equivalent to a 1 dB step. The final section SBD carries the sub-band data as variable length fixed point values, with the particular coding being obtained from the data in the SBA section.

The technique of the present invention is based on the scale-factor coding of streams such as the MPEG stream, with the attenuation and mixing of the streams exploiting a feature of the scale-factor tables, namely the relation of the table entries to the previous entry by the fixed ratio equivalent to a 1 dB step.

We have recognised that, by limiting ourselves to attenuations of 1 dB granularity, we can implement attenuation of an MPEG stream by simple additions to the scale-factor indices in the stream. For example, attenuating a frame by 0.5 (equivalent to 3 dB) is done by adding 3 to all the scale factor indices in the frame. A check is preferably included to determine overflow (exceeding an index value of 62 for the scale-factor table) with consequent capping at that value. If we get an underflow (an attempted negative value), the allocation value for this sub-band is held to zero, and can be ignored.

Figure 2:
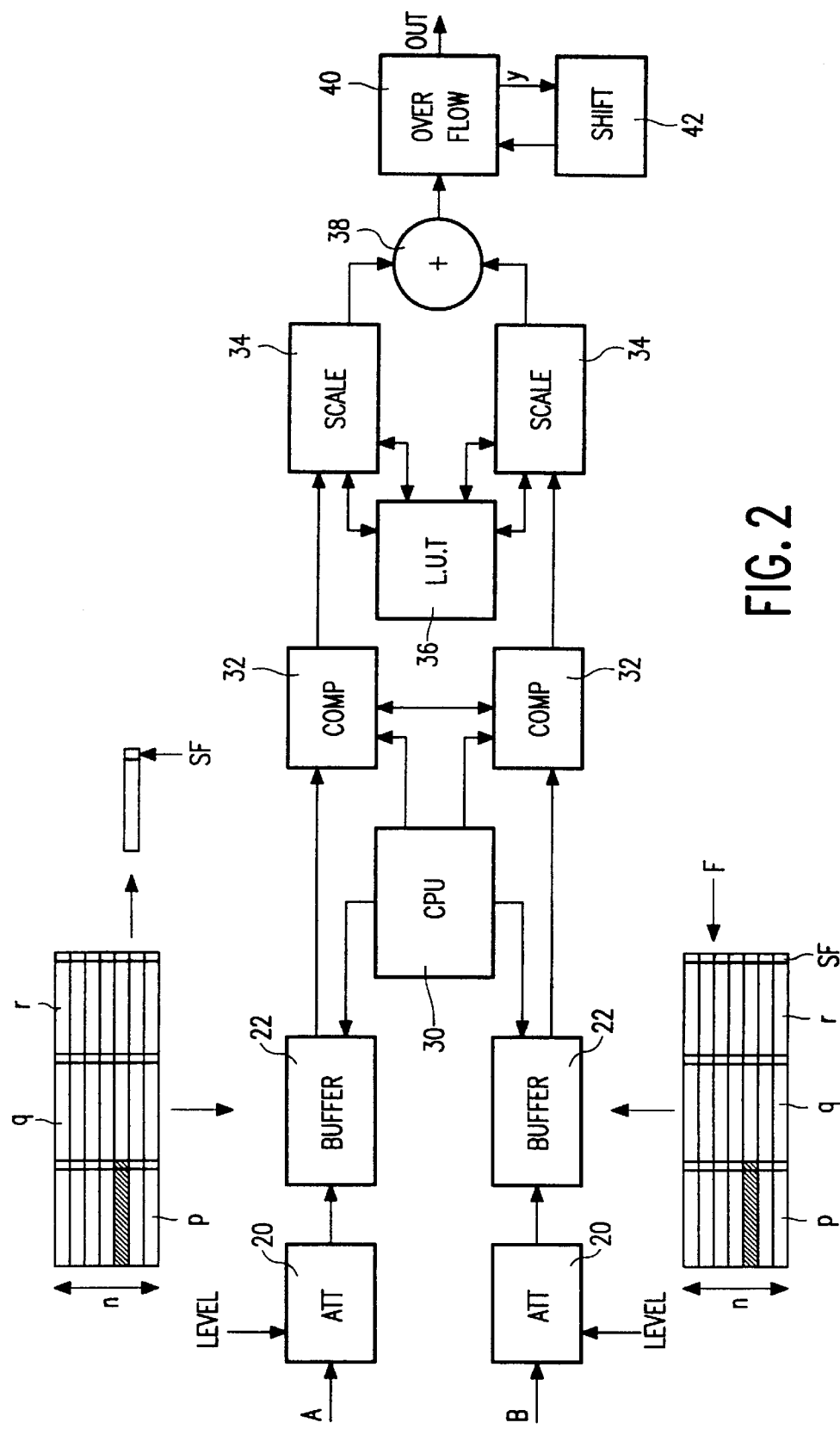
FIG. 2 is a block schematic diagram representing a process embodying the present invention of mixing two audio data streams.

An extension of this technique for the mixing of two or more streams, each in the form of a respective series of MPEG frames as described above, will now be described with reference to FIG. 2 which shows a data frame F for each of two audio streams from respective sources A and B. Each frame is in the form of n sub-band rows (where n is typically 27 as explained above) each containing the three groups p, q, r of 12 samples, with a respective scale factor index value SF for each group in each sub-band.

From the respective sources, the two streams are initially attenuated (at 20) in the manner previously described and by an amount determined by a respective control signal LEVEL. Following attenuation, the frames to be mixed are respectively buffered (at 22) from which buffer the data is extracted, group by group and sub-band by sub-band under control of a processor 30 which acts to mix the corresponding groups of the two or more frames for mixing (a pair of groups to be mixed are indicated by shading in the two frames).

Trivial cases of sub-band data not being present in both streams (or being present in only one) are handled first. If both streams contain data for the current sub-band, then the sub-band data is processed one group at a time, beginning with comparison of the scale-factor indices for the first two groups, at 32. If the indices differ by more than a certain pre-programmed value, the group with the smaller index (the larger scale-factor) is output, and the other group is discarded, as it is assumed that the volume of this stream drowns out the other. The pre-programmed value (which might, for example, be 24) is suitably based on the maximum resolution of the data size used. If the difference is less than this value, the data for the two groups is added together.

This addition is done by first selecting the group with the smaller scale factor index as the base group and then scaling (at 34) the 12 sub-band samples of the other group, so that they are in the same scale range as the first. This is suitably done by a pre-calculated two dimensional look-up table 36 indexed by the difference in scale factor indices of the two groups, and by the data value in question. These scaled values, for the second group sub-band data, are added (at 38) directly to the first group sub-band data. If overflow occurs, which is determined at 40, the summed value is divided by 2 (by a simple shift 42 of the binary data) and the scale-factor of the group is adjusted accordingly (it must be multiplied by 2, which is achieved by simply subtracting 3 from the scale-factor index). Once a group has been processed, a check is made for each value where overflow has occurred, following which a corresponding shift by one place is applied to all the values where overflow did not occur in order to properly scale them.

To ensure the relative simplicity of implementation for this technique, the un-scaled sub-band data should be normalised as part of the stream input process. This normalisation (setting sub-band data values to a common length) may suitably be achieved by clipping or zero-bit stuffing as will be readily understood; where possible, it is preferred to avoid normalisation to less than the input data size, however, as this may result in some loss of quality. The choice of normalising bit-length has an effect on the size of the look-up table: a length of 8-bits will set the size to be N*256 where N is the maximum scale-factor difference for which addition is still to occur (in the region of 24 for an 8-bit value). For a length of 16-bits, the size of the look-up table would leap to N*64K, which may be a problem on small machines having relatively low memory capacity. The problem is compounded by the requirement for N also to be larger, as more bits are significant and consequently a greater difference of scale-factors will still be discernable.

In order to cope with these larger bit-lengths, use is again made of the fact that scaling by 0.5 is equal to a scale factor difference of 3. Thus, for a 16-bit arrangement, division is implemented by shifting the input value D/3 places (where D is the scale-factor difference) and using the result to index into a much smaller look-up table, together with D modulo-3. As will be recognised, D modulo-3 may be zero, one, or two and, if zero, no-look up is needed; consequently, for 16-bits, the table would be 2*64K long.

Figure 4:
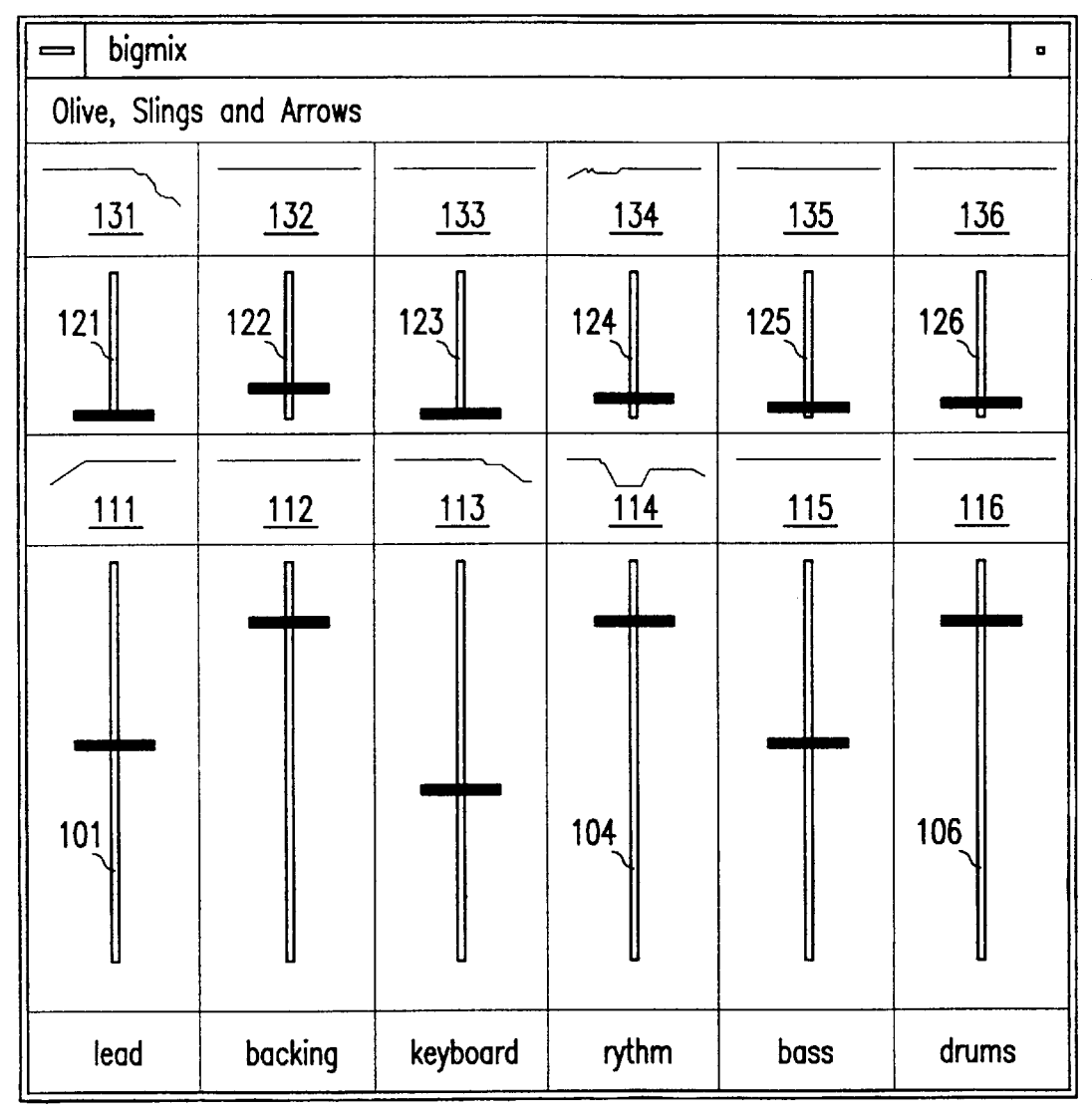

The attenuation and mixing method may be wholly or partly implemented in software, for example running on CPU 30 (FIG. 2) generating an on-screen display having features keyed to various audio sources. Examples of such on-screen displays are given in FIGS. 3 to 5, with FIGS. 3 and 4 showing variations on a demonstration application of a six track audio mixer. Six input tracks are stored as separate MPEG audio streams, with the user being enabled to mix these tracks in real time using volume control sliders 101–106 displayed on the workstation screen and moved by selection and dragging thereof with a cursor moved by a mouse or similar user-operable input device. The current setting of each of the sliders 101–106 determines the value of the LEVEL input to the respective attenuation stage 20 shown in FIG. 2.

FIG. 4 illustrates a screen display control panel for an enhanced mixer having features additional to the volume controls 101–106 of FIG. 3. A set of movable frequency traces 111–116 is provided, one per channel, representing the frequency filtering across the spectrum for that channel: a high level horizontal line (as at 112, 115 and 116) indicates no filtering across the spectrum whilst the trace at 111 shows some attenuation of lower frequencies. These traces, again manipulated by cursor, determine whether constant attenuation is applied to all groups in all sub-bands of a frame or whether differing attenuation is applied to certain sub-bands in dependence on the frequency bandwidth they cover.

Above traces 111–116 are further sliders 121–126 which control the delay length in a reverberation loop formed by mixing the output of a channel into the input after a delay period. Further traces 131–136 illustrate and control the frequency spectrum and filtering of the output signal as being mixed back in to the input.

Figure 5:
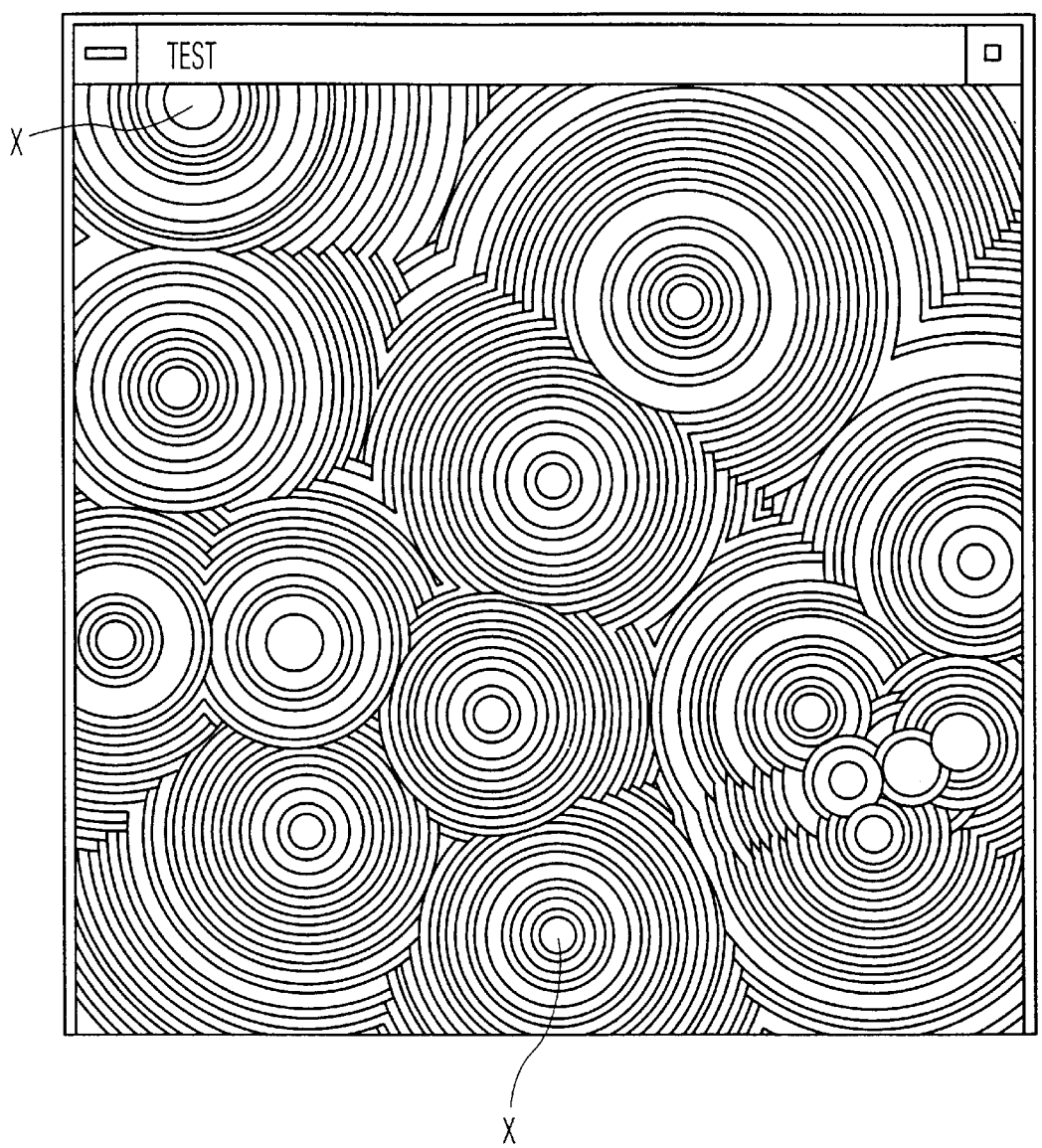
FIG. 5 illustrates a form of screen display which may be used in conjunction with control functions of the present invention.

An alternative graphical user interface is shown in FIG. 5 and illustrates a pattern formed of groups of concentric circles. Each group has associated with it a stored audio track (MPEG audio) which is played as the user positions a cursor (not shown) on the centre of the group (indicated at X) or in some other way indicates the group. As the cursor is moved toward another group, the audio track associated with that group begins to become heard: in operation the position of the cursor relative to each group centre determines the relative attenuation (or lack of it) applied to the respective audio with the audio from all of the different groups suitably being mixed as described above. Such techniques are also applicable within, for example, virtual environments where different features of the virtual world have associated sound which is controllably played or muted depending on the position of a user (or some control means thereof relative to the features.

From the foregoing, it will be seen that we have described a new technique for attenuating and mixing of audio streams, particularly suited for audio streams according to the MPEG standard. Previously, the data would have had to have been decompressed prior to mixing, thereby limiting the number of possible streams to be mixed simultaneously, either due to CPU requirements or storage medium bandwidth limitations. By using CPU usage analysis tools, it may be seen that the mixing of the MPEG streams is using very little CPU power compared to the software synthesis stage.

From reading the present disclosure, other modifications will be apparent to persons skilled in the art. Such modifications may involve other features which already known in the field of audio signal and data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of applying attenuation to a compressed digitized audio signal such as an MPEG compressed digitized audio signal, wherein a first table of L scale-factors is defined comprising a stepped series of L numerical values with the second and each subsequent value being derived from the preceding value by a common function and each of the scale-factors being uniquely identified by a respective scale factor index value, and said signal is in the form of sequential frames of digital data, with each frame, in a common arrangement, comprising at least the following sections:

sub-band data values, representing a plurality of sample-point values for one or more sub-bands, wherein each sub-band represents a respective frequency bandwidth; and scale-factor index values, at least one index value being assigned to each of said sub-bands and identifying the respective numerical scaling factor to be applied thereto on decompression of the signal; said method comprising: generating said scale factor index values which comprise L sequential integer values, and for each sub-band:
identifying the desired attenuation as M steps of said series of L numerical values; and
adding M to each scale factor index assigned to said sub-band, wherein $1 \leq M < L$, and L and M are integers, to attenuate said compressed digitized audio signal.

2. A method as claimed in claim 1, wherein a plurality of sub-bands representing respective frequency bandwidths are defined in a frame, and the method includes determining and applying a respective value of M for each sub-band.

3. A method as claimed in claim 1, wherein the second and each subsequent one of the L scale factor values is a fixed percentage of the preceding value.

4. A method as claimed in claim 1, wherein the separation of the steps of the scale-factor table corresponds to a 1 dB attenuation.

5. A method as claimed in claim 1, wherein the or each input signal complies with MPEG audio standards.

6. A method of mixing two or more compressed digitized audio signals such as MPEG compressed digitized audio signals, wherein a first table of L scale-factors is defined comprising a stepped series of L numerical values with the second and each subsequent value being derived from the preceding value by a common function and each of the scale-factors being uniquely identified by a respective scale factor index value, and each said signal is in the form of sequential frames of digital data, with each frame, in a common arrangement, comprising at least the following sections:

sub-band data values, representing a plurality of sample-point values for one or more sub-bands, wherein each sub-band represents a respective frequency bandwidth; and scale-factor index values, at least one index value being assigned to each of said one or more sub-bands and identifying the respective numerical scaling factor to be applied thereto on decompression of the signal; said method comprising: generating said scale factor index values which comprise L sequential integer values, and mixing respective sub-bands from each signal and, for each group of sub-bands to be mixed:
identifying the sub-band having the largest associated scale-factor;
scaling the data values of those sub-bands having smaller associated scale-factors to the same scale range as the first; and
adding the respective sets of data values together, to mix said compressed digitized audio signals.

7. A method as claimed in claim 6, comprising the initializing steps of:
identifying a desired attenuation for at least one of said sub-band pair, as M steps of said series of L numerical values; and
adding M to the or each scale factor index assigned to said sub-band, wherein $1 \leq M < L$, and L and M are integers.

8. A method as claimed in claim 6, wherein the scaling of the sub-band data values is by use of a two-dimensional look-up table indexed by the difference in scale-factor index values of the two sub-bands, and by the data value in question.

9. A method as claimed in claim 6, wherein a plurality of sub-bands representing respective frequency bandwidths are defined in a frame, and the method includes determining and applying a respective value of M for each sub-band.

10. A method as claimed in claim 6, wherein if the step of identifying the sub-band having the larger associated scale-factor shows a difference between the scale-factors in excess of a predetermined threshold, the sub-band having the smaller scale-factor is not scaled but is discarded and the sub-band having the larger scale-factor is output.

11. A method as claimed in claim 6, wherein following addition of said respective sets of sub-band data values, a check is made to determine whether the result exceeds a predetermined number of bits in length and, if so, the scale-factor index for said result is incremented by an integer value to scale the result.

12. A method as claimed in claim 6, wherein the second and each subsequent one of the L scale factor values is a fixed percentage of the preceding value.

13. A method as claimed in claim 6, wherein the separation of the steps of the scale-factor table corresponds to a 1 dB attenuation.

14. A method as claimed in claim 6, wherein the or each input signal complies with MPEG audio standards.

* * * * *